United States Patent
Mont et al.

(10) Patent No.: US 7,321,660 B2
(45) Date of Patent: Jan. 22, 2008

(54) METHOD AND APPARATUS FOR ENCRYPTING/DECRYPTING DATA USING TIMED-RELEASE KEYS

(75) Inventors: Marco Casassa Mont, Bristol (GB); Keith Alexander Harrison, Monmouthshire (GB); Martin Sadler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 851 days.

(21) Appl. No.: 10/379,455

(22) Filed: Mar. 3, 2003

(65) Prior Publication Data

US 2003/0198348 A1    Oct. 23, 2003

(30) Foreign Application Priority Data

Apr. 18, 2002    (GB) .................................. 0208858.1

(51) Int. Cl.
*H04K 1/04* (2006.01)
*H04K 1/06* (2006.01)
*H04L 9/00* (2006.01)
*H04N 7/167* (2006.01)

(52) U.S. Cl. .......................... 380/277; 380/35; 380/44; 380/218; 380/277; 380/279; 713/153; 713/175

(58) Field of Classification Search .................. 380/35, 380/277; 713/175
See application file for complete search history.

(56) References Cited

U.S. PATENT DOCUMENTS

| 5,337,357 | A   |   | 8/1994  | Chou et al. |     |
|-----------|-----|---|---------|-------------|-----|
| 5,768,389 | A   | * | 6/1998  | Ishii ............................ | 380/30 |
| 5,875,247 | A   |   | 2/1999  | Nakashima et al. | |
| 6,603,857 | B1  | * | 8/2003  | Batten-Carew et al. ....... | 380/44 |
| 6,813,358 | B1  | * | 11/2004 | Di Crescenzo et al. ..... | 380/280 |
| 2001/0052071 | A1 |   | 12/2001 | Kudo et al. ................. | 713/156 |
| 2003/0081785 | A1 | * | 5/2003  | Boneh et al. ............... | 380/277 |
| 2003/0099360 | A1 | * | 5/2003  | Hoang ........................ | 380/277 |

FOREIGN PATENT DOCUMENTS

| EP | 0 784 256 A1 | 7/1997 |
| EP | 0 997 808 A2 | 5/2000 |
| EP | 1 043 878 A2 | 10/2000 |
| GB | 2 276 965 A  | 10/1994 |
| JP | 11-27252     | 1/1999  |

(Continued)

OTHER PUBLICATIONS

Blake, Ian F. et al. "Scalable, Server-Passive, User-Anonymous Timed Release Public Key Encryption from Bilinear Pairing", Sep. 2004.*

(Continued)

*Primary Examiner*—Kambiz Zand
*Assistant Examiner*—Michael J Simitoski
(74) *Attorney, Agent, or Firm*—Ladas & Parry, LLP

(57) ABSTRACT

A computer system comprises a first computer entity arranged to encrypt data using an encryption key comprising a time value, and a second computer entity arranged to generate, at intervals, a decryption key using a current time value. The encryption and decryption processes are such that the decryption key generated using a current time value corresponding to that used for the encryption key, is apt to decrypt the encrypted s data.

27 Claims, 2 Drawing Sheets

FOREIGN PATENT DOCUMENTS

WO         01/46782 A2      6/2001

OTHER PUBLICATIONS

Boneh, Dan et al. "Identity-Based Encryption from the Weil Pairing", Aug. 2001.*
Di Crescenzo, Giovanni et al. "Conditional Oblivious Transfer and Timed-Release Encryption", May 1999.*
Mao, Wenbo. "Timed-Release Cryptography", Aug. 2001.*
May, Timothy C. "Timed-Release Crypto", published to Cypherpunks Feb. 1993, copy at <http://cypherpunks.venona.com/date/1995/09/msg01183.html>.*
Microsoft Press. Computer Dictionary, Third Edition, 1997 Microsoft Corporation, pp. 93 and 399.*
Mont, Marco Casassa et al. "The HP Time Vault Service: Innovating the Way Confidential Information is Disclosed, at the Right Time", Sep. 2002.*

Rivest, Ronald L. et al. "Time-lock puzzles and timed-release Crypto", Mar. 1996.*

Boneh et al. ; "Identity-Based Encryption from the Weil Pairing;" *Crypto*; 2001; pp. 1-31.

Cocks; "An Identity Based Encryption Scheme based On Quadratic Residues; " *Communications-Electronics Security Group*; 2001; 4 pages; http://www.cesg.gov.uk/technology/idpkc/media/ciren.pdf.

Rivest, R., et al., "Time Lock Puzzles and timed release cryptography", *Technology Report*, MIT/LCS/TR-684, retrieved Nov. 29, 2006 from theory.lcs.mit.edu/~rivest/ RivestShamirWagner-timelock.ps.

* cited by examiner

METHOD AND APPARATUS FOR ENCRYPTING/DECRYPTING DATA USING TIMED-RELEASE KEYS

TECHNICAL FIELD

The present invention relates to a method and apparatus for encrypting/decrypting data.

BACKGROUND

When dealing with private and confidential information there is frequently a need to ensure that the information is kept private and confidential until a specific time, for example for seal bids the originator of a bid needs to be confident that their bid is not disclosed until a specific date.

It is an object of the present invention to facilitate the release of confidential information at (or possibly after) a specific time.

One known approach for maintaining the confidentiality of data is the use of encryption. However, traditional encryption techniques, such as the use of symmetric keys or PKI encryption, require that an appropriate decryption key is known at the time of encryption. Therefore, to ensure confidentiality the decryption key must be securely stored until required. Should, however, someone obtain unauthorised access to the decryption key this could allow unauthorised access to the confidential data. Further, the setting up and use of symmetric keys and PKI encryption can be complex.

A more recent cryptographic schema is Identifier-Based Encryption (IBE). In this schema, a data provider encrypts payload data using an encryption key string and public data provided by a trusted authority; the data provider then provides the encrypted payload data to a recipient who decrypts it using a decryption key provided by the trust authority together with the latter's public data. The trusted authority's public data is derived by the authority from private data using a one-way function. Features of the IBE schema are that any kind of string (including a name, a role, etc.) can be used as an encryption key string, and that the generation of the decryption key is effected by the trust authority using the encryption key string and its private data, enabling the generation of the decryption key to be postponed until needed for decryption.

A number of IBE algorithms are known, including the "Quadratic Residuosity" (QR) method described in the paper: "An Identity Based Encryption Scheme based on Quadratic Residues". C. Cocks Communications-Electronics Security Group (CESG), UK. Other IBE algorithms are known such as the use of Weil or Tate pairings—see, for example: D. Boneh, M. Franklin—Identity-based Encryption from the Weil Pairing. Crypto 2001-2001.

SUMMARY OF THE INVENTION

In accordance with a first aspect of the present invention there is provided a security method, comprising:
  first operations, effected by a discloser of data, comprising encrypting the data and providing the encrypted data to a recipient, the encryption process using both an encryption key comprising a time value and public data provided by a trusted party and derived thereby from private data; and
  second operations, effected by the trusted party, comprising using both said private data and further data in order to determine, at intervals, a decryption key which is then output; said further data comprising, at each determination of the decryption key, a new current time value derived independently of said encryption key, the decryption key being so determined that, for a said current time value equalling the time value used by the data discloser for its encryption key, the decryption key is apt to decrypt the discloser's encrypted data.

This provides the advantage of ensuring that a decryption key required to decrypt encrypted data is only generated when access to confidential information is authorised.

According to a second aspect of the present invention, there is provided a A computer system comprising:
  a first computing entity arranged to encrypt, for output, first data according to an encryption process involving both an encryption key comprising a time value, and second data provided by a trusted party;
  a second computing entity associated with the trusted party and arranged to determine, for output, a decryption key using both third data and fourth, private, data from which said second data has been derived; the second computing entity being arranged to determine said decryption key at intervals using as said third data, at each determination, a new current time value derived independently of said encryption key, and
  a third computing entity arranged to receive both the encrypted first data and the decryption key, and to decrypt the received encrypted first data using the received decryption key determined using as said third data a said current time value equalling the time value used by the first computing entity for its encryption key.

According to a third aspect of the present invention, there is provided apparatus for generating a decryption key, comprising a memory for holding private data, a clock, and a processor for generating, at intervals, a decryption key using both said private data and a current time value from the clock, each decryption key generated being apt to decrypt data encrypted using both public data derived from said private data and a time value corresponding to the current time value used in generating the decryption key.

BRIEF DESCRIPTION OF THE DRAWINGS

For a better understanding of the present invention and to understand how the same may be brought into effect reference will now be made, by way of example only, to the accompanying drawings, in which.

DESCRIPTION OF AN EMBODIMENT OF THE INVENTION

The present invention addresses the issue of controlling access to data, where the owner/originator of the relevant data wishes to restrict access to the data until a specific time (which could include year, month, day as well as hours and minutes). This is achieved by using a encryption key to encrypt the data where the encryption key is derived using data that equates to the specific time the owner/originator of the data wishes to allow access to the data, and where the corresponding decryption key is only generated at that specific time (i.e. at the time owner/originator wishes to allow access to the data).

Figure 1:
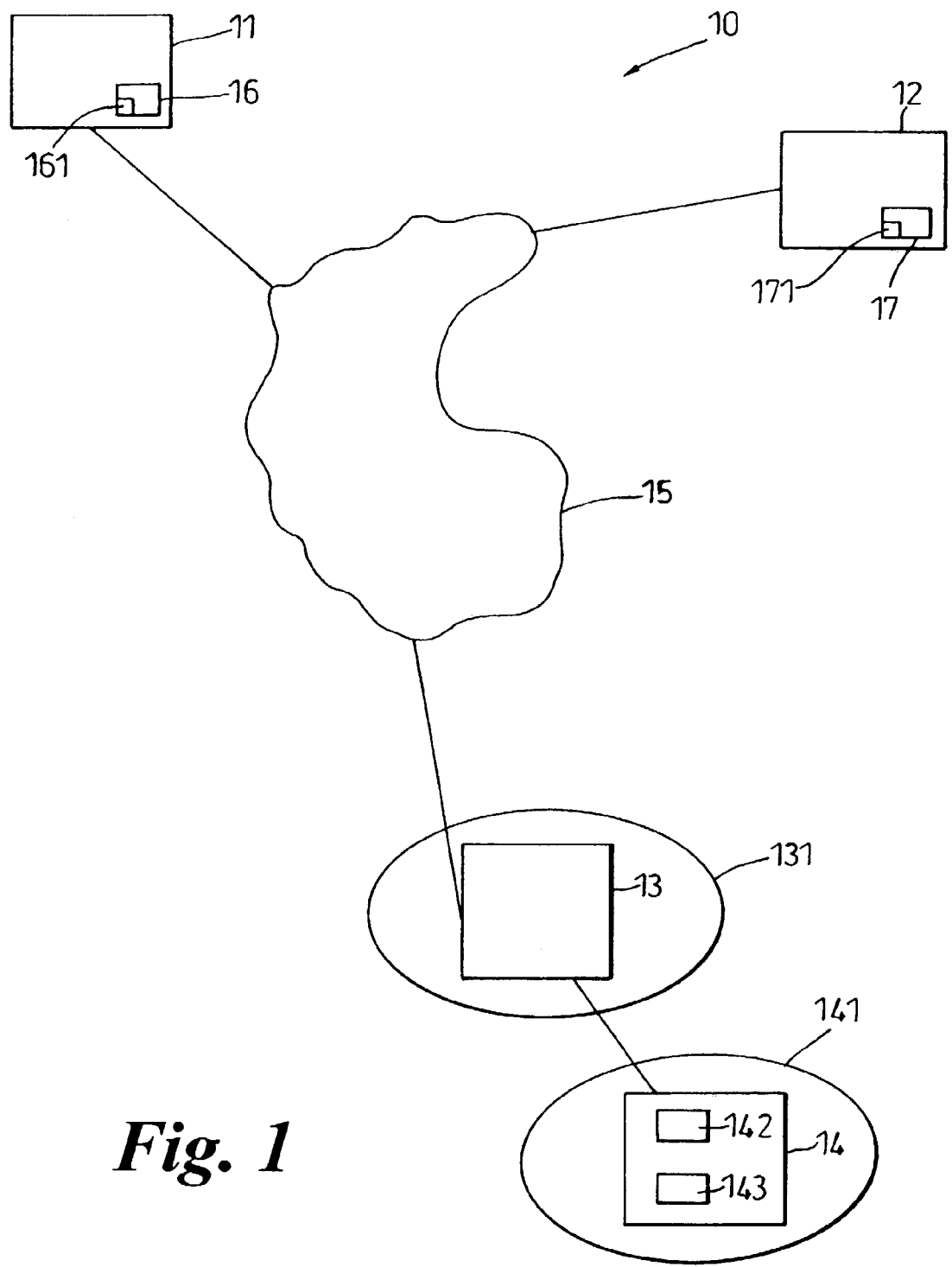
FIG. 1 illustrates a computer system according to an embodiment of the present invention.

FIG. 1 illustrates a computer system 10 according to an embodiment of the present invention. Computer system 10 includes a first computer entity 11, a second computer entity 12, a third computer entity 13 and a fourth computer entity 14. The three computer entities 11, 12, 13 are coupled via a network 15, for example the Internet, while the fourth computer entity 14 is coupled directly to the third computer entity 13, via a secure link.

Associated with the first computer entity 11 is a document generation software application 16, for example Acrobat writer, that includes a software plug-in 161 for allowing encryption of documents generated by the application using an identity based encryption IBE mechanism, as described below. Associated with the second computer entity 12 is a document reader software application 17, for example Acrobat reader, that includes a software plug-in 171 for allowing decryption of documents generated by the document generation software application 16 of the first computer entity 11 using an identity based encryption IBE mechanism, as described below. The third computer entity 13 acts as a distribution service 131 for the fourth computer entity 14, where the fourth computer entity 14 acts as a trust authority 141 that makes available, via the distribution service 131 of the third computer entity 13, trust authority encryption data 142 and decryption key data 143, as described below. As would be appreciated by a person skilled in the art the distribution service 131 can make available the trust authorities encryption data 142 and decryption key data 143 in a variety of ways, for example via a web site.

As the fourth computer entity 14 is acting as a trust authority 141 the fourth computer entity 14 would ideally operate in a secure environment, for example within a secure building, or secure room and/or be constructed as a tamper-resistant box.

Figure 2:
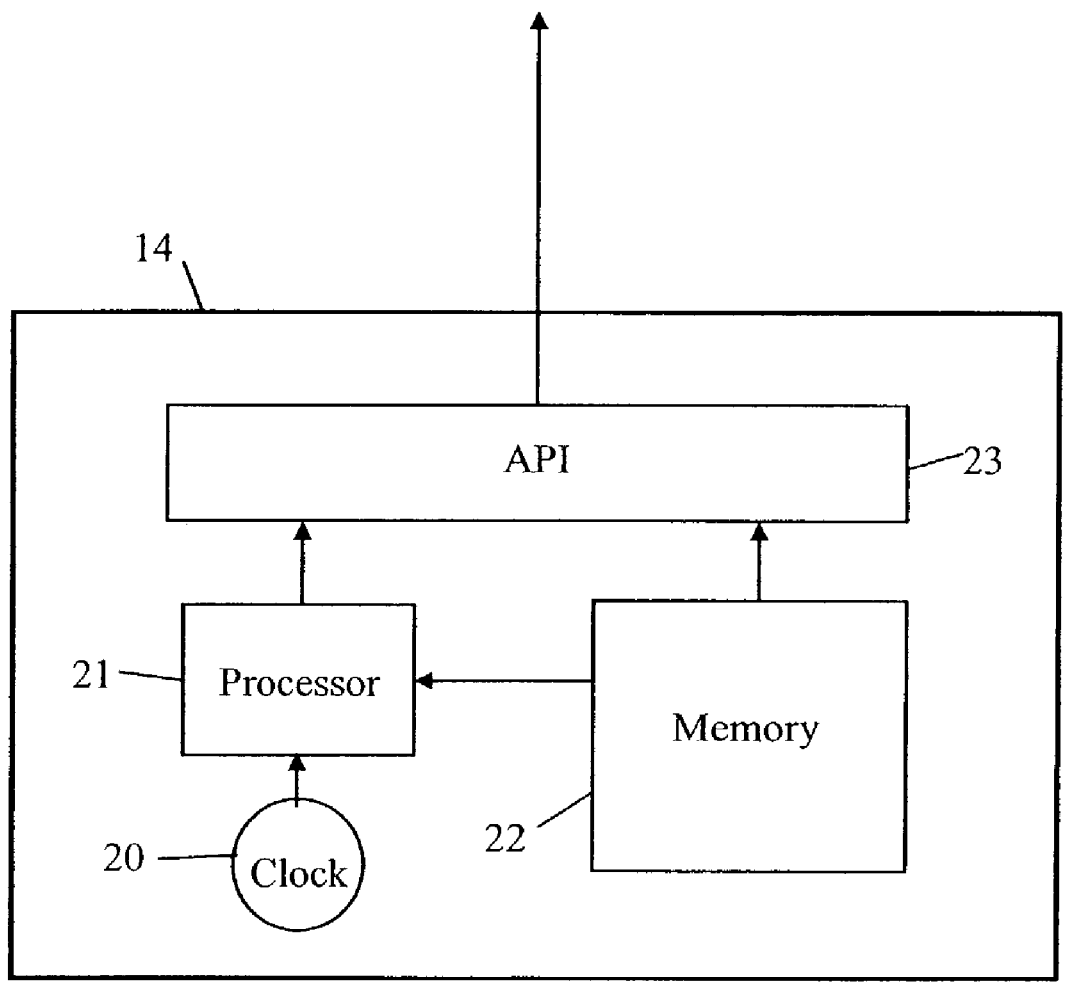
FIG. 2 illustrates a computer apparatus according to an embodiment of the present invention.

As shown in FIG. 2, incorporated within the fourth computer entity 14 is a clock 20, a processor 21, memory 22 for storing the trust authority's encryption data 142 and algorithms for the generation of decryption keys based upon IBE, and an application program interface 23 API to allow the fourth computer entity 14 to interface with the third computer entity 13. In this embodiment, using a QR IBE encryption/decryption mechanism, the trust authority's encryption data 142 comprises:

- a hash function # which when applied to a string returns a value in the range 0 to N−1, and
- a value N that is a product of two random prime numbers p and q, where the values of p and q are only known to the trust authority 17; the values of p and q should ideally be in the range of $2^{511}$ and $2^{512}$ and should both satisfy the equation: p, q≡3 mod 4 (however, p and q must not have the same value).

A process for allowing encryption of data using a encryption key generated with a data set representing a time and decryption of the data using a decryption key generated at substantially the same time as the time represented by a data set will now be described. In the present context, "time" can be a time-of-day value and/or a calendar date or any other measure of time.

A user of the first computer entity 11 creates a document using the document generation software application 16. When the user wishes to restrict the intended recipients access to the document until a specified time (for example until a specific hour of a given day, month and year) the user inputs into the document generation software application 16 this specific time, this could be achieved, for example, by the application 16 being arranged to prompt the user with a request as to when the information should be made available to the recipient.

Using the time information input by the user the software plug-in encrypts, using the IBE mechanism, the document using the time information, or typically a digital representation of the time information, as the encryption key.

For example, using the QR IBE encryption/decryption technique to encrypt each bit m of the user's document the software plug-in 161 generates random numbers $t_+$ (where $t_+$ is an integer in the range $[0, 2^N)$) until the software plug-in 161 finds a value of $t_+$ that satisfies the equation jacobi($t_+$, N)=m, where m has a value of −1 or 1 depending on whether the corresponding bit of the user's document is 0 or 1 respectively. (As is well known, the jacobi function is such that where $x^2 \equiv \#$ mod N the jacobi(#, N)=−1 if x does not exist, and =1 if x does exist). The software plug-in 161 then computes the value:

$$S_+ = (t_+ + \#(\text{encryptionkeystring})/t_+) \bmod N$$

for each bit m, where $s_+$ corresponds to the encrypted bit of m.

Since #(encryptionkeystring) may be non-square the software plug-in 161 additionally generates additional random numbers $t\_0$ (integers in the range $[0, 2^N)$) until the software plug-in 161 finds one that satisfies the equation jacobi($t_-$, N)=m. The software plug-in 161 then computes the value:

$$s_- = (t_- - \#(\text{encryptionkeystring})/t_-) \bmod N$$

for each bit m.

The document generation application 16 obtains the trust authorities encryption data 142 by any suitable means, for example the encryption data could be pre-loaded within the software plug-in 161 or could be downloaded from the distribution service 131, via the network 15.

The time information format used to generate the encryption key will typically be determined by the trust authority 141 that provides the associated decryption key and, typically, will be standardised, for example Greenwich Mean Time GMT or Universal Time Co-ordinates UTC.

Once encrypted the encrypted data (that is, the values s+ and s for each bit m of the user's data) is made available to the intended recipient via the second computer entity 17, by any suitable means, for example via e-mail or by being placed in a electronic public area. The identity of the trust authority 141 and encryption key (i.e. the designated time period from when the intended recipient can access the document) can also be provided to the recipient if the intended recipient does not already have access to this information.

To decrypt the data the document reader software application plug-in 171 needs to obtain, from the distribution service 131, a decryption key that corresponds to the encryption key, as described below, where the decryption key is only generated at the appropriate time (i.e. at substantially the same time as the time represented by the data set used to generate the encryption key).

The fourth computer entity 14, using clock 20 information, generates decryption keys at specific (preferably regular) time intervals. Any suitable time intervals for the generation of associated decryption keys can be used, therefore depending on the circumstance this could be, for example, seconds, minutes or day. Accordingly, the clock time ideally would include years, months, days, hours and minutes. The first computer entity 11 will have chosen the time value used for its encryption key to be a value corresponding to a time for which the computer entity will generate a decryption key.

For example, if the trust authority 141 is arranged to provide a decryption key on the hour every hour, when the clock 20 indicates to the processor 21 that an hour has elapsed since the last decryption key was generated the processor 21 calculates a decryption key using an "encryptionkeystring" that corresponds to the current hour time. The resultant decryption key will be apt to decrypt data that has been encrypted using the same "encryptionkeystring" value. Thus the decryption key corresponding to the encryption key used by the first computer entity is not generated until the specific time selected by the first computer entity for when access to the encrypted data is authorised. Therefore, if data has been encrypted using a encryption key that corresponds, for example, to 14.00 GMT on a given day, month and year at 14.00 GMT on that specific day, month and year, on indication of this from the clock 20, the processor 21 calculates a decryption key that is associated with the encryption key.

The associated decryption key B is determined by the trust authority 141 as follows:

$$B^2 = \#(encryptionkeystring) \mod N (\text{"positive" solution})$$

If a value of B does not exist, then there is a value of B that is satisfied by the equation:

$$B^2 = -\#(encryptionkeystring) \mod N (\text{"negative" solution})$$

As N is a product of two prime numbers p, q it would be extremely difficult for any one to calculate the decryption key B with only knowledge of the encryption key string and N. However, as the trust authority 141 has knowledge of p and q (i.e. two prime numbers) it is relatively straightforward for the trust authority 141 to calculate B.

On calculation of the decryption key the fourth computer entity 14 provides the decryption key to the distribution service 131 (together, preferably, with an indication of whether this is the "positive" or "negative" solution for B), thereby making the decryption key available to the recipient of the encrypted data and allowing the recipient to decrypt the encrypted data.

The distribution service 131 can make the decryption key available by any suitable means, for example, via a web site or distributed in conjunction with transmitted time information over a national or global time distribution system. The distribution service 131 is arranged to make available (i.e. publish) the encryption key for use by the recipient, where the recipient may, for example, correspond to a group of people within a company or globally to everyone.

If the distribution service 131 makes the decryption keys available via a web site the distribution service 131 could include load-balancing machines (not shown) to spread the web site access load.

Additionally, the distribution service 131 could also maintain a database of previously available decryption keys, thereby allowing a recipient of encrypted data to obtain an appropriate decryption key for some time after the represented time used to generate the encryption key.

If the square root of the encryption key returns a positive value, the users data M can be recovered using:

$$m = jacobi(s_+ + 2B, N)$$

If the square root of the encryption key returns a negative value, the users data M can be recovered using:

$$m = jacobi(s\_30\ 2B, N)$$

The recipient may choose to cache the decryption key to decrypt the document at a later date.

As stated above, the above embodiment uses the QR IBE encryption/decryption mechanism, however, other forms of IBE could be used such as those based on Weil or Tate pairings.

Although the above embodiment describes the control of access to a document, the above embodiment could equally apply to other forms of data.

Additionally, the fourth computer entity 14 could be configured to allow an authorised individual to reconfigure the fourth computer entity 14 to allow the generation of previously created decryption keys, for example if the distribution service database was destroyed.

The source of time used by the trust authority need not be a clock of the computer entity 14 but could be time signals received from another source though in this case, appropriate measures are preferably applied to ensure that the time signals are secure.

The invention claimed is:

1. A security method, comprising:
    first operations, effected by a discloser of data, comprising encrypting the data and providing the encrypted data to a recipient, the encryption process using both an encryption key comprising a future time value, and public data provided by a trusted party, the public data being derived thereby from private data; and
    second operations effected by the trusted party where the trusted party is arranged to perform at specific time intervals in response to signals from a clock, the second operations comprising:
    using both said private data and further data in order to determine, at the specific time intervals, a decryption key which is then output and
    outputting the decryption key by publishing it via a distribution system;
    said further data comprising, at each determination of the decryption key, a current time value derived independently of said encryption key, the decryption key being so determined that, for said current time value equalling the future time value used by the data discloser for its encryption key, the decryption key is useful to decrypt the discloser's encrypted data.

2. A method according to claim 1, wherein said current time value is derived from a real-time clock associated with the trusted party.

3. A method according to claim 1, wherein the decryption key is determined at regular time intervals.

4. A method according to claim 1, wherein said current time value corresponds to a date.

5. A method according to claim 1, wherein the future time value used as the encryption key is chosen from amongst time values known to be ones that will be used as current time values in determining the decryption key.

6. A method according to claim 1, wherein the cryptographic processes effected in respect of the said encryption and decryption keys are cryptographic processes utilising quadratic residuosity.

7. A method according to claim 1, wherein the cryptographic processes effected in respect of the said encryption and decryption keys are cryptographic processes utilising Weil or Tate pairings.

8. A method according to claim 1, wherein the distribution system includes the Internet and wherein the decryption key by is made publicly available via the Internet.

9. A computer system comprising:
    a first computing entity arranged to encrypt, for output, first data according to an encryption process involving both an encryption key comprising a future time value and second data provided by a trusted party;

a second computing entity associated with the trusted party and arranged to determine, at specific time intervals in response to signals from a clock, a decryption key using both third data and private fourth data and to output the decryption key, said second data having been derived from said fourth data;

the second computing entity being arranged to determine said decryption key at the specific time intervals using as said third data, at each determination, a current time value derived independently of said encryption key, the second computing entity also being coupled to a distribution system for making decryption keys generated thereby publicly available; and a third computing entity arranged to receive both the encrypted first data and the decryption key, and to decrypt the received encrypted first data using the received decryption key determined using as said third data a current time value equalling the future time value used by the first computing entity for its encryption key.

10. A computer system according to claim 9, wherein the second computing entity comprises tamper resistant means to inhibit tampering.

11. A computer system according to claim 9, wherein the second computing entity includes a real-time clock from which said current time values are generated.

12. A computer system according to claim 9, wherein said current time value corresponds to a date.

13. A computer system according to claim 9, wherein the second computing entity is arranged to determine the decryption key at regular time intervals.

14. A computer system according to claim 9, wherein the first computing entity is arranged to select as said future time value, a time value that it expects is one for which the second computing entity will use as said current time value for determining the decryption key.

15. A computer system according to claim 9, wherein the cryptographic processes effected by the first, second and third computing entities in respect of the said encryption and decryption keys are cryptographic processes utilising quadratic residuosity.

16. A computer system according to claim 9, wherein the cryptographic processes effected by the first, second and third computing entities in respect of the said encryption and decryption keys are cryptographic processes utilising Weil or Tate pairings.

17. A computer system according to claim 9, wherein the distribution system includes the Internet.

18. Apparatus for generating a decryption key, comprising a memory for holding private data, a clock, and a processor for generating, at specific time intervals in response to signals from the clock, a decryption key using both said private data and a current time value from the clock, each decryption key generated being useful to decrypt data encrypted using both public data derived from said private data and a time value corresponding to the current time value used in generating the decryption key.

19. Apparatus according to claim 18, further comprising tamper resistant means to inhibit tampering with the apparatus.

20. Apparatus according to claim 18, wherein said current time value corresponds to a date.

21. Apparatus according to claim 18, wherein the decryption key is generated by a cryptographic process utilising quadratic residuosity.

22. Apparatus according to claim 18, wherein the decryption key is generated by a cryptographic process utilising Weil or Tate pairings.

23. Apparatus according to claim 18, wherein the decryption key is made publicly available via the Internet.

24. Apparatus according to claim 18, wherein the decryption key is made available to a group of people.

25. A method of controlling access to data, where a provider of the data wishes to restrict access to the data until a particular future time and upon the occurrence of said particular future time, third parties are then provided access to the data, said method comprising:

i. using a encryption key to encrypt the data where the encryption key is derived using information that is at least partially based upon said particular future time, ii. generating decryption keys periodically, each periodic decryption key being associated with a then-current time;

iii. making the periodic decryption keys automatically available to one or more third parties; and iv. the one or more third parties being able to decrypt the data only after a particular periodic decryption key is made available to them, said particular periodic decryption key having its associated then-current time equal to said particular future time.

26. A method according to claim 25, wherein the periodic decryption keys are made automatically available to one or more third parties at specific time intervals in response to signals from a clock.

27. A method according to claim 25, wherein the periodic decryption keys are made publicly available by publishing them via the Internet.

* * * * *